United States Patent [19]

Angevine et al.

[11] 4,431,518

[45] Feb. 14, 1984

[54] HIGH NITROGEN-CONTAINING OIL PROCESSING

[75] Inventors: Philip J. Angevine, West Deptford; Guenter H. Kuehl; Sadi Mizrahi, both of Cherry Hill, all of N.J.

[73] Assignee: Mobil Oil Corporation, New York, N.Y.

[21] Appl. No.: 425,014

[22] Filed: Sep. 27, 1982

[51] Int. Cl.$^3$ .................. C10G 11/05; C10G 47/16
[52] U.S. Cl. .................................... 208/111; 208/114
[58] Field of Search ............................... 208/111, 114

[56] References Cited

U.S. PATENT DOCUMENTS

| | | | |
|---|---|---|---|
| 3,099,036 | 10/1972 | Hass et al. | 208/114 X |
| 4,148,713 | 4/1979 | Rollman | 208/111 |
| 4,268,420 | 5/1981 | Klotz | 252/432 |
| 4,269,813 | 5/1981 | Klotz | 252/432 X |
| 4,285,919 | 8/1981 | Klotz et al. | 252/432 X |
| 4,331,641 | 5/1982 | Hinnenkamp et al. | 252/432 X |
| 4,394,251 | 7/1983 | Miller | 208/111 |

Primary Examiner—Delbert E. Gantz
Assistant Examiner—George Schmitkons
Attorney, Agent, or Firm—Alexander J. McKillop; Michael G. Gilman; Dennis P. Santini

[57] ABSTRACT

This invention relates to an improved process for reducing the pour point of oil feedstocks containing high levels of total nitrogen, e.g. shale oil or fractions thereof, wherein the same is contacted with a catalyst comprising a boron-containing crystalline material having the structure of zeolite ZSM-5 under conditions including elevated temperature and pressure.

9 Claims, 1 Drawing Figure

HIGH NITROGEN-CONTAINING OIL PROCESSING

BACKGROUND OF THE INVENTION

1. Field of the Invention

This invention relates to an improved process for reducing the pour point of oil stocks containing high levels of organic (total) nitrogen wherein the same is contacted with a catalyst comprising a boron-containing crystalline material having the structure of zeolite ZSM-5 under conditions including elevated temperature and pressure. The improvement of the present method resides in improved ability to shape-selectively crack normal paraffins in charge stocks containing high basic nitrogen concentrations at low or nil hydrogen consumption with improved catalyst life due to decreased coking.

2. Description of Prior Art

Hydrocarbon conversion processes utilizing crystalline zeolites and, in particular, aluminosilicate catalysts have been the subject of extensive investigation during recent years as is clear from both the patent and scientific literature. Crystalline aluminosilicates have been found to be particularly effective for a wide variety of hydrocarbon conversion processes and have been described and claimed in many patents including U.S. Pat. Nos. 3,140,249; 3,140,252; 3,140,251; 3,140,253; and 3,271,418. Aside from serving as general catalysts in hydrocarbon conversion processes, it is also known that the molecular sieve properties of zeolites can be utilized to preferentially convert one molecular species from a mixture of the same with other species.

In a process of this type a zeolite molecular sieve is employed having catalytic activity within its internal pore structure and pore openings such that one component of a feed is capable of entering within the internal pore structure thereof and being converted to the substantial exclusion of another component which, because of its size, is incapable of entering within the pores of the zeolitic material. Shape selective catalytic conversion is also known in the art and is disclosed and claimed in U.S. Pat. Nos. 3,140,322; 3,379,640 and 3,395,094.

Although a wide variety of zeolitic materials and particularly crystalline aluminosilicates have been successfully employed in various catalytic conversion processes, nevertheless, these prior art processes, in general, fell into one or two main categories. In one type of conversion process a zeolite was employed which had a pore size sufficiently large to admit the vast majority of components normally found in a charge, i.e., these materials are referred to as large pore size molecular sieves and they are generally started to have a pore size of from 6 to 13 angstroms and are represented by zeolites X, Y and L. The other type of aluminosilicate was one which had a pore size of approximately 5 angstrom units and it was utilized to preferentially act upon normal paraffins to the substantial exclusion of other molecular species. Thus, by way of considerable over-simplification until recently, there were only two types of aluminosilicates which were available for hydrocarbon processing—those which would admit only normal paraffins and those which would admit all components normally present in a hydrocarbon feed charge. See U.S. Pat. No. 3,700,585 and Canadian Pat. No. 829,282.

The cracking and/or hydrocracking of petroleum stocks is in general well known and widely practiced. It is known to use various zeolites to catalyze cracking and/or hydrocracking processes.

Of particular recent interest has been the use of a novel class of catalysts to assist in the dewaxing of hydrocarbon oils. U.S. Pat. No. 3,700,585 discloses and claims the cracking and hydrocracking of paraffinic materials from various hydrocarbon feedstocks by contacting such feedstock with a crystalline zeolite ZSM-5 having a silica to alumina mole ratio of from 5 to 100 at about 550° to 1100° F., 0.5 to 200 LHSV and with a hydrogen atmosphere in some cases. This patent is based upon work on the dewaxing of gas oils, particularly virgin gas oils, and crudes although its disclosure and claims are applicable to the dewaxing of any mixture of straight chain, slightly branched chain and other configuration hydrocarbons. The catalyst preferably contains acidic cations and may have a hydrogenation/dehydrogenation component incorporated therein.

Other U.S. Patents teaching dewaxing of various petroleum stocks are U.S. Pat. No. Re. 28,398; U.S. Pat. Nos. 3,852,189; 3,891,540; 3,894,933; 3,894,938; 3,894,939; 3,926,782; 3,956,102; 3,968,024; 3,980,550; 4,067,797 and 4,192,734.

SUMMARY OF THE INVENTION

The present invention is directed to a process for upgrading and improving the quality of oil stocks containing high levels of total, e.g. organic or basic, nitrogen, such as for example, up to about 3 weight percent and more usually from about 0.01 weight percent to about 3 weight percent. The process comprises contacting said oil stock under cracking (dewaxing) conditions including an average reactor temperature of from about 600° F. to about 850° F., a liquid hourly space velocity of from about 0.2 to about 2.0, a hydrogen circulation rate of from about 500 SCF/BBl to about 10,000 SCF/BBl, and a pressure of from about 400 psig to about 2500 psig with a catalyst comprising a crystalline boron-containing material having the structure of zeolite ZSM-5.

BRIEF DESCRIPTION OF THE DRAWING

The FIGURE is a plot of product pour point relative reactor temperature for the present invention.

EMBODIMENTS

Figure 1:
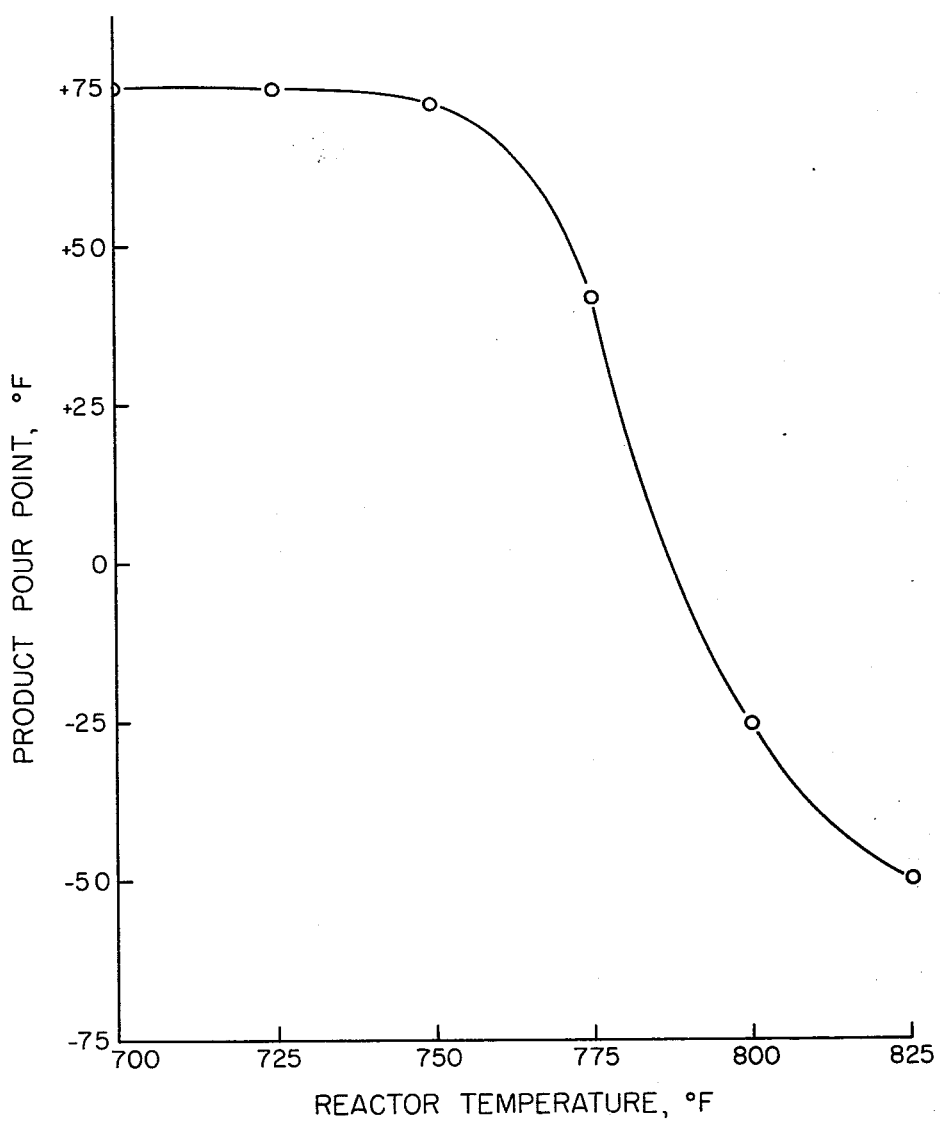

Reducing the pour point of high nitrogen-containing oil stocks by shape-selective cracking of normal paraffins is quite difficult by conventional catalytic methods due to catalyst poisoning by the basic nitrogen compounds therein contained. The present process utilizing a highly siliceous boron-containing crystalline material having the structure of zeolite ZSM-5 makes it possible to effectively dewax such feedstock containing high concentrations of nitrogen compounds. Product quality and pumpability is improved and hydrotreating severity often required in processing such feedstock is decreased when the present method is applied. This results in lower overall hydrogen consumption and the attendant economics.

The hydroconversion catalyst for use in the present process comprises crystalline highly siliceous boron-containing material having the structure of zeolite ZSM-5. Zeolite ZSM-5 is described in U.S. Pat. No. 3,702,886 and U.S. Pat. No. Re. 29,948, the contents of each being entirely incorporated herein by reference. The highly siliceous boron-containing material for use herein comprises a three-dimensional continuous silicon-containing framework structure which is essentially the same as conventional zeolite ZSM-5 except for the fact that $B_2O_3$ is substituted in the present catalyst zeolite for $Al_2O_3$. Aluminum and boron are in the crystal framework of the catalyst zeolite and are not of cationic form. The boron-containing zeolite ZSM-5 for use herein utilizes $B_2O_3$ as a substitute for $Al_2O_3$ in increasing amounts and the mole ratio of $SiO_2$ to $B_2O_3$ is most usually from about 20 to about 500 in the zeolite. The $SiO_2$ to $Al_2O_3$ mole ratio may be from about 20 to about infinity, with a preferred range of from about 80 to about 3000.

The boron-containing zeolite ZSM-5 for use in the present invention, as synthesized, has a definite X-ray diffraction pattern characteristic of conventional aluminosilicate zeolite ZSM-5, and shows the significant lines set forth in Table 1.

TABLE 1

| Interplanar Spacing d(A): | Relative Intensity |
|---|---|
| 11.1 ± 0.2 | s |
| 10.0 ± 0.2 | s |
| 7.4 ± 0.15 | w |
| 7.1 ± 0.15 | w |
| 6.3 ± 0.1 | w |
| 6.04 } ± 0.1 | w |
| 5.97 | |
| 5.56 ± 0.1 | w |
| 5.01 ± 0.1 | w |
| 4.60 ± 0.08 | w |
| 4.25 ± 0.08 | w |
| 3.85 ± 0.07 | vs |
| 3.71 ± 0.05 | s |
| 3.04 ± 0.03 | w |
| 2.99 ± 0.02 | w |
| 2.94 ± 0.02 | w |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$, is the intensity of the strongest line or peak, and d (obs.), the interplanar spacing in Angstroms, corresponding to the recorded lines, were calculated. In Table 1 the relative intensities are given in terms of the symbols s=strong, w=weak and and vs=very strong. It should be understood that this X-ray diffraction pattern is characteristic of all the species of the boron-containing zeolite for use herein as synthesized. Ion exchange of the sodium ion with cations reveals substantially the same pattern with some minor shifts in interplanar spacing and variation in relative intensity. Other minor variations can occur depending on the silicon-/aluminum/boron ratios of the particular sample and the extent of thermal conditioning.

The anhydrous composition of the boron-containing zeolite ZSM-5 in the "as crystallized" form can also be identified, in terms of mole ratios of oxides, as follows:

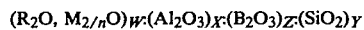

wherein W/X+Z is from greater than about 0.5 to less than about 3; Y/X+Z is greater than about 20; Z/X+Z is from about 0.6 to about 1.0; R is a nitrogen-containing cation, which may include primary amines containing 2 to 10 carbon atoms and ammonium cations, preferably the tetraalkylammonium cation in which the alkyl contains from 2 to 5 carbon atoms; M is a metal from Group IA of the Periodic Table of Elements, ammonium, hydrogen or mixtures thereof; and n is the valence of M.

Synthesis of the boron-containing zeolite ZSM-5 for use herein may be from a reaction mixture containing sources of the tetrapropylammonium cation (as from the hydroxide), sodium oxide, silica, water, and a source of boron and, optionally, alumina, which will yield the zeolite. The content of boron can range in the final product up to about 1.5 percent by weight. It will be understood that each component utilized in the reaction mixture for preparing the zeolite can be supplied by one or more initial reactants and they can be mixed together in any order. For example, sodium can be supplied by an aqueous solution of sodium hydroxide, or by an aqueous solution of sodium silicate; tetrapropylammonium cation can be supplied by the hydroxide or a halide salt. The reaction mixture can be prepared either batchwise or continuously. Crystal size and crystallization time of the composition will vary with the nature of the reaction mixture employed. It will be further understood that in the very high silica-to-alumina mole ratios, it may not be necessary to add a source of alumina to the reaction mixture since residual amounts in other reactants may suffice.

The zeolite can be prepared from a reaction mixture having a composition, in terms of mole ratios of oxides falling within the following ranges:

TABLE 2

| | Broad | Preferred | Most Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $SiO_2/Al_2O_3$ | 500–α | 750–30,000 | 1,000–10,000 |
| $SiO_2/B_2O_3$ | 4–300 | 6–200 | 8–100 | wherein R is an organic moiety in a nitrogen-containing cation.

Typical reaction conditions consist of heating the foregoing reaction mixture to a temperature of from about 200° F. to about 400° F. for a period of time of from about six hours to 120 days. A more preferred temperature range is from about 212° F. to about 400° F. with the amount of time at a temperature in such range being from about 12 hours to 10 days.

The digestion of the gel particles is carried out until crystals form. The crystalline product is separated from the reaction medium, as by cooling the whole to room temperature, filtering and water washing.

The foregoing product is dried, e.g. at 230° F., for from about 8 to 24 hours. Of course, milder conditions may be employed if desired, e.g., room temperature. The organic components can be removed by calcination. The calcined zeolite may be ion-exchanged, and calcined again at from about 500° F. to about 1500° F., preferably from about 850° F. to about 1200° F.

The original alkali metal of the boron-containing zeolite ZSM-5 can be replaced, at least in part, in accordance with techniques well-known in the art by ion-exchange with other cations. Replacing cations may include metal ions, ammonium ions, hydrogen ions, and mixtures thereof. The metal ions include those derived from metals of Group II and VIII of the Periodic Table, rare earth metals, calcium and manganese.

Typical ion-exchange techniques include contacting the zeolite with a salt of the desired replacing cation or cations. Hydrolysis of boron can be suppressed by exchanging at a pH higher than 7, preferably above 9. Although a wide variety of salts can be employed, particular preference is given to chlorides, nitrates, sulfates and acetates.

Representative ion-exchange techniques are disclosed in a wide variety of patents including U.S. Pat. Nos. 3,140,249; 3,140,251; and 3,140,253.

Following contact with the salt solution of the desired replacing cations, the zeolite is then preferably washed with water and dried at a temperature ranging from about 150° F. to about 340° F. and thereafter calcined in air or inert gas at temperatures ranging from about 500° F. to 1500° F. for a period of time ranging from 1 minute to 48 hours or more.

Regardless of the cations replacing the sodium or other alkali metal in its synthesized form, the spatial arrangement of the aluminum, boron, silicon and oxygen atoms which form the basic crystal lattices of the zeolite remains essentially unchanged by the described replacement of sodium or other alkali metal as determined by taking an X-ray powder diffraction pattern of the ion-exchanged materials. Such X-ray diffraction pattern of the ion-exchanged product reveals a pattern substantially the same as that set forth in Table 1 above.

The boron-containing zeolite ZSM-5 can be shaped in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, it can be extruded before drying or dried or partially dried and then extruded.

As in the case of many catalysts, it is desired to incorporate the boron-containing zeolite with another material resistant to the temperatures and other conditions employed in organic conversion processes. Such materials include active and inactive materials and synthetic or naturally occurring zeolites as well as materials such as clays, silica and/or metal oxides. The latter may be either naturally occurring or in the form of gelatinous precipitates or gels including mixtures of silica and metal oxides. Use of an active material in conjunction with the present composition, i.e., combined therewith, would tend to enhance the conversion and/or selectivity of the catalyst in certain organic conversion processes. Inactive materials suitably serve as diluents to control the amount of conversion in a given process so that products can be obtained economically and in orderly manner without employing other means for controlling the rate of reaction. Normally, zeolite materials have been incorporated into naturally occurring clays, e.g., bentonite and kaolin, to improve the crush strength of the catalyst under commercial operating conditions. These clay binders have been employed for the purpose of improving the crush strength of the catalyst.

Naturally occurring clays which can be composited with the boron-containing zeolite ZSM-5 include the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined, or they can be initially subjected to calcination, acid treatment or chemical modification.

In addition to the foregoing materials, the boron-containing zeolite ZSM-5 can be composited with a porous matrix material such as silica, alumina, silica-magnesia, silica-zirconia, silica-thoria, silia-beryllia, silica-titania as well as ternary compositions such as silica-alumina-thoria, silica-alumina-zirconia, silica-alumina-magnesia and silica-magnesia-zirconia. Silica-alumina is not as useful in the catalyst for the present process as a matrix material as the others listed above since it is desirable not to add additional acid sites to the catalyst composition. The matrix can be in the form of a cogel. The relative proportions of finely divided boron-containing zeolite and inorganic oxide gel matrix vary widely, with the zeolite content ranging from about 1 to about 90 percent by weight and more usually, particularly when the composite is prepared in the form of beads, in the range of about 2 to about 50 percent by weight of the composite.

The oil feedstock to the instant improved process will be high in total nitrogen content, i.e. up to about 3 weight percent and more usually from about 0.01 weight percent to about 3 weight percent. Non-limiting examples of such feedstocks include raw, hydrotreated or otherwise treated shale oil or fractions thereof, tar sands bitumen or fractions thereof, coal liquids or fractions thereof and high organic nitrogen-containing petroleum liquids and fractions thereof. Such feedstocks contain organic nitrogen distributed throughout their boiling range. The shale oil feedstocks, for example, will have a relatively high pour point due to high normal paraffin content. Of course, mixtures of the various suitable feedstocks may be advantageously processed hereby.

Due to the low acid strength of the catalyst for use herein, basic nitrogen compounds are observed to poison the catalyst contacted therewith to a considerably lesser extent than a conventional zeolite ZSM-5. Since coking occurs by way of an acid activity cracking mechanism in such processes as presently claimed, reduced coking is also observed.

A shale oil, for example, contemplated for use as charge stock to the present process will contain from about 0.01 weight percent to about 2.5 weight percent, and usually about 2 weight percent of organic (total) nitrogen distributed throughout its boiling range. It will also have a high pour point of from about 50° F. to about 110° F. due to its high normal paraffin content of from about 10 to about 50 weight percent. Reducing the pour point of this chargestock by shape-selective cracking of the normal paraffins over conventional aluminosilicate zeolite catalysts is difficult because the basic nitrogen compounds adsorb on the catalyst's acid sites. Coking on such catalysts becomes a problem at reaction temperatures above about 775° F. The catalytic sites of the boron-containing zeolite ZSM-5 catalyst have a lower acid strength than such conventional catalysts and, therefor, do not adsorb basic nitrogen compounds as strongly. Since the coking tendency of the boron-containing zeolite ZSM-5 is low, desorption of these compounds from the catalyst surface at high temperature is possible without substantial coking and light gas production.

The following examples illustrate practice of the present invention.

EXAMPLE 1

The boron-containing crystalline material having a ZSM-5 structure and the catalyst comprising same for use herein were prepared by the method set forth below.

Boric acid, 19.2 grams, and 28.8 grams of sodium hydroxide were dissolved in 2304 grams of water. Tetrapropylammonium bromide, 362.4 grams, was added and dissolved. To the composite solution was added 439.8 grams of silica sol (30% $SiO_2$), Ludox LS, with vigorous stirring. The reaction mixture was heated at 329° F. for 216 hours. The crystalline product obtained had the X-ray diffraction pattern of ZSM-5 and the crystallinity was 120% compared with a reference sample. The sorption capacities were, in grams/100 grams of zeolite at 25° C.:

|  |  |
|---|---|
| Cyclohexane, 20 mm Hg | 2.1 |
| n-Hexane, 20 mm Hg | 10.8 |
| Water, 12 mm Hg | 10.4 |

The chemical composition was:

|  | Dried at 329° F. | Ignited Weight Basis |
|---|---|---|
| $SiO_2$, wt. % | 84.8 | 96.7 |
| $B_2O_3$, wt. % | 1.23 | 1.40 |
| $Al_2O_3$, ppm | 460 | 525 |
| $Na_2O$, wt. % | 1.05 | 1.20 |
| N, Wt. % | 0.90 | — |
| Ash, Wt. % | 87.7 | 100 |
| $SiO_2/(Al_2O_3 + B_2O_3)$, molar | 78 | |
| $B/(Al + B)$ | 0.975 | |

The crystalline material consisted of near-spherulitic particles with a diameter in the range of 1–2 microns.

The above material was heated in an ammonia stream to 1112° F. and held at that temperature for 1 hour. The calcined material was then allowed to cool to ambient temperature in an ammonia atmosphere.

The above crystalline product was then exchanged three times for 2 hours at room temperature with a solution, 0.1N $NH_4Cl$ and 1N $NH_4OH$ (5.35 grams $NH_4Cl$+60 grams of concentrated $NH_4OH$/liter), using 50 cc per gram of zeolite per exchange. The pH of the exchange solution was 10.4. The solid was filtered, washed chloride-free with 1N $NH_4OH$ and dried at ambient temperature. It contained 0.02% residual sodium.

The ammonium form of the boron-containing crystalline material was then mulled with alumina monohydrate in the weight ratio of 65% zeolite and 35% alumina, both based on ash. Water was added to obtain an extrudable blend. The mixture was then extruded with a 1/16-inch die, dried at 248° F. and calcined for 3 hours at 1000° F. in air to provide a catalyst material which proved to have an Alpha Value of 2.4.

As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysis, Vol. IV, pp. 522–529 (August 1965).

EXAMPLE 2

A shale oil having first been hydrotreated in a conventional manner and having the properties listed below:

|  |  |
|---|---|
| Gravity, °API | 36.1 |
| Pour Point, °F. | 70 |
| Hydrogen, % Wt. | 13.81 |
| Sulfur, % Wt. | 0.133 |
| Nitrogen, ppm | 340 |
| Yields (D2887) % Wt. | |
| I–400 ° F. | 13.6 |
| 400–650° F. | 50.6 |
| 650–850° F. | 26.9 |
| 850° F. | 8.9 | was contacted in a dewaxing reactor with catalyst prepared in Example 1 at a LHSV of 0.5, a pressure of 2000 psig and a hydrogen circulation rate of 5000 SCF/BBL. As the reactor temperature progressed through the range of 700° F. to 825° F., product pour point was measured. The results are presented in FIG. 1. Product yields for this example were as follows:

| | Reactor Temperature, °F. | | |
|---|---|---|---|
| Yields (D2887), % wt. | 725 | 775 | 825 |
| $C_1$–$C_3$ | 0.09 | 1.1 | 4.2 |
| $C_4$ | 0.12 | 1.3 | 3.6 |
| $C_5$ | 0.27 | 1.5 | 3.5 |
| $C_6$–400° F. | 12.5 | 17.0 | 29.5 |
| 400–650° F. | 52.5 | 53.8 | 51.8 |
| 650–850° F. | 26.0 | 25.0 | 15.0 |
| 850° F.+ | 8.4 | 4.5 | 1.5 |
| Hydrogen cons., SCF/BBL | −2 | −9 | 114 |

EXAMPLE 3

A shale oil having first been treated to remove heavy metals and having the properties listed below:

|  |  |
|---|---|
| Gravity, °API | 21.9 |
| Pour Point, °F. | 75 |
| Hydrogen, % wt. | 11.51 |
| Sulfur, % wt. | 0.59 |
| Nitrogen, % wt. | 2.02 |
| Yields (D2887), % wt. | |
| IBP–400° F. | 4 |
| 400–650° F. | 34 |
| 650° F.+ | 62 | was contacted in a dewaxing reactor with catalyst prepared in Example 1 at a pressure of 2000 psig (1900 psig hydrogen partial pressure) and a hydrogen circulation rate of 5000 SCF/BBl. Reaction particulars including product pour points and yields were measured and are shown below:

| Conditions | ←800→ | | | ←825→ |
|---|---|---|---|---|
| Reactor Temp., °F. | | | | |
| LHSV, Vo/Vc-Hr | 0.8 | 0.6 | 1.1 | 0.5 |
| Yields (D2887), % Wt. | | | | |
| $C_1$–$C_3$ | 2.8 | 2.8 | 3.3 | 3.7 |
| $C_4$ | 0.7 | 0.8 | 0.8 | 1.3 |
| $C_5$ | 0.3 | 1.0 | 0.4 | 1.7 |
| $C_6$–400° F. | 15 | 17 | 26 | |
| 400–650° F. | 43 | 43 | 48 | 93 |
| 650° F.+ | 38 | 35 | 22 | |
| $H_2$ Cons., SCF/BBl. | 340 | 390 | 450 | 635 |
| Pour Point, °F. | 45 | 30 | 15 | −10 |
| Data Corrected to 0.5 LHSV | | | | |
| Pour Point, °F. | — | 20 | — | −10 |
| $H_2$ cons. SCF/BBl. | — | 490 | — | 635 |

EXAMPLE 4

A quantity of the same shale oil as used in Example 3 was subjected to distillation and the high-pour 650° F.+ fraction having the following properties:

| | |
|---|---|
| Gravity °API | 17.0 |
| Pour Point, °F. | 100 |
| Hydrogen, % wt. | 11.4 |
| Sulfur, % wt. | 0.51 |
| Nitrogen, % wt. | 2.4 | was contacted with catalyst prepared in Example 1 in a dewaxing reactor at a pressure of 2000 psig and 5000 SCF/BBl hydrogen circulation. Reaction particulars including product yields and pour points were measured and are shown below:

| Conditions | | | |
|---|---|---|---|
| Reactor Temp., °F. | 800 | ← 825 → | |
| LHSV, Vo/Vc-Hr | 0.5 | 1.0 | 0.41 |
| Yields (D2887), % Wt. | | | |
| $C_1$-$C_3$ | 3.1 | 7.9 | 8.0 |
| $C_4$ | 0.6 | 2.9 | 2.6 |
| $C_5$ | 0.3 | 1.5 | 1.4 |
| $C_6$-400° F. | 13 | 17 | 20 |
| 400-650° F. | 34 | 31 | 36 |
| 650° F.+ | 49 | 39 | 32 |
| $H_2$ Cons., SCF/BBl. | 250 | 590 | 925 |
| Pour Point, °F. | 60 | 15 | −35 |
| Data Corrected to 0.5 LHSV | | | |
| Pour Point, °F. | 60 | — | −25 |
| $H_2$ cons. SCF/BBl. | 250 | — | 760 |

EXAMPLE 5

A quantity of the same shale oil as used in Example 3 was contacted with low acidity aluminosilicate NaZSM-5 in a dewaxing reactor at 2000 psig and 5000 SCF/BBl hydrogen circulation. The product yields and pour point obtained were measured. The following table compares the results from this example to those obtained in Example 3:

| | Example 3 | Example 5 |
|---|---|---|
| Conditions | | |
| Reactor Temp., °F. | 800 | 803 |
| LHSV, Vo/Vc-Hr | 0.6 | 0.4 |
| Yields, % Wt. | | |
| $C_1$-$C_3$ | 2.8 | 7.6 |
| $C_4$ | 0.8 | 1.6 |
| $C_5$ | 1.0 | 1.4 |
| $C_6$+ | 95.4 | 89.4 |
| $H_2$ Cons., SCF/BBl. | 390 | 750 |
| Pour Point, °F. | 30 | 5 |
| Data Corrected to 0.5 LHSV | | |
| Pour Point, °F. | 20 | 23 |
| $H_2$ cons. SCF/BBl. | 490 | 570 |

The data corrected for the space velocity difference shows that the boron-containing catalyst consumes less hydrogen while performing as well as the zeolite used in Example 5 for pour point reduction. This is due to the lower light-gas yield by the low acid-strength boron-containing ZSM-5.

EXAMPLE 6

The feedstock as used in Example 3, having been hydrotreated in a conventional manner, was subjected to distillation and the 650° F.+ fraction having the following properties:

| | |
|---|---|
| Gravity, °API | 28.4 |
| Pour Point, °F. | 105 |
| Hydrogen, % wt. | 13.24 |
| Sulfur, % wt. | 0.25 |
| Nitrogen, % wt. | 0.2 | was contacted with a conventional HZSM-5 dewaxing catalyst at a pressure of 2000 psig and a hydrogen circulation rate of 5000 SCF/BBl. Reaction particulars including product yields and pour point were measured. The results are shown below:

| Conditions | | | |
|---|---|---|---|
| Temperature, °F. | 775 | 800 | 825 |
| LHSV, Vo/Vc-Hr | 0.46 | 0.50 | 0.43 |
| Yields, % Wt. | | | |
| $C_1$-$C_3$ | 0.82 | 1.82 | 5.3 |
| $C_4$ | 0.63 | 1.59 | 5.6 |
| $C_5$ | 0.35 | 1.70 | 5.6 |
| $6_6$+ | 98.2 | 95.1 | 83.9 |
| $H_2$ Cons., SCF/BBl. | 15 | 138 | 270 |
| Pour Point, °F. | 95 | 80 | 20 |

Comparison of the pour point data from this Example 6 to the data in Example 4 shows that under identical reaction conditions the boron-containing ZSM-5 was more effective for pour point reduction. This is in spite of the 10-fold higher nitrogen concentration in the feed in Example 4. This indicates that the boron-containing crystalline material having the structure of zeolite ZSM-5 has increased resistance to nitrogen poisoning.

What is claimed is:

1. A process for reducing the pour point of an oil feedstock having a nitrogen content of up to about 3 weight percent which comprises contacting said feedstock under pour point reducing conditions with a catalyst comprising a boron-containing crystalline material having an X-ray diffraction pattern substantially as set forth in Table 1.

2. The process of claim 1 wherein said crystalline material has an anhydrous composition as synthesized, in terms of mole ratios of oxides, as follows:

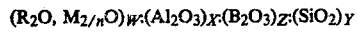

$$(R_2O, M_{2/n}O)_W : (Al_2O_3)_X : (B_2O_3)_Z : (SiO_2)_Y$$

wherein W/X+Z is from greater than about 0.5 to less than about 3; Y/X+Z is greater than about 20; Z/X+Z is from about 0.6 to about 1.0; R is a nitrogen-containing cation; M is a metal from Group IA of the Periodic Table of Elements, ammonium, hydrogen or mixtures thereof; and n is the valence of M.

3. The process of claim 1 wherein said crystalline material has been ion exchanged with ammonium ions, hydrogen ions, metal ions or mixtures thereof.

4. The process of claim 1 wherein said crystalline material has been calcined.

5. The process of claim 2 wherein said catalyst comprises the calcined product of the as synthesized crystalline material.

6. The process of claim 3 wherein said crystalline material has been calcined.

7. The process of claim 1, 2, 3, 4, 5, or 6 wherein said feedstock is selected from the group consisting of raw shale oil, hydrotreated shale oil, a fraction of raw shale oil, a fraction of hydrotreated shale oil and mixtures thereof.

8. The process of claim 1, 2, 3, 4, 5 or 6 wherein said feedstock is selected from the group consisting of tar sands bitumen and fractions thereof, coal liquids and fractions thereof and petroleum liquids and fractions thereof.

9. The process of claim 1, 2, 3, 4, 5 or 6 wherein the pour point reducing conditions include a temperature of from about 600° F. to about 850° F., a liquid hourly space velocity of from about 0.2 to about 2.0, a pressure of from about 400 psig to about 2500 psig and a hydrogen circulation rate of from about 500 SCF/BBl to about 10,000 SCF/BBl.

* * * * *

UNITED STATES PATENT AND TRADEMARK OFFICE
CERTIFICATE OF CORRECTION

PATENT NO. : 4,431,518

DATED : February 14, 1984

INVENTOR(S) : Angevine et al

It is certified that error appears in the above—identified patent and that said Letters Patent is hereby corrected as shown below:

Column 1, line 54, "started" should read --stated--.

Signed and Sealed this

Twenty-sixth Day of June 1984

[SEAL]

Attest:

GERALD J. MOSSINGHOFF

Attesting Officer   Commissioner of Patents and Trademarks